H. J. MITCHELL.
PLANER KNIFE SHARPENER.
APPLICATION FILED MAR. 14, 1910.
990,373.
Patented Apr. 25, 1911.
2 SHEETS—SHEET 1.
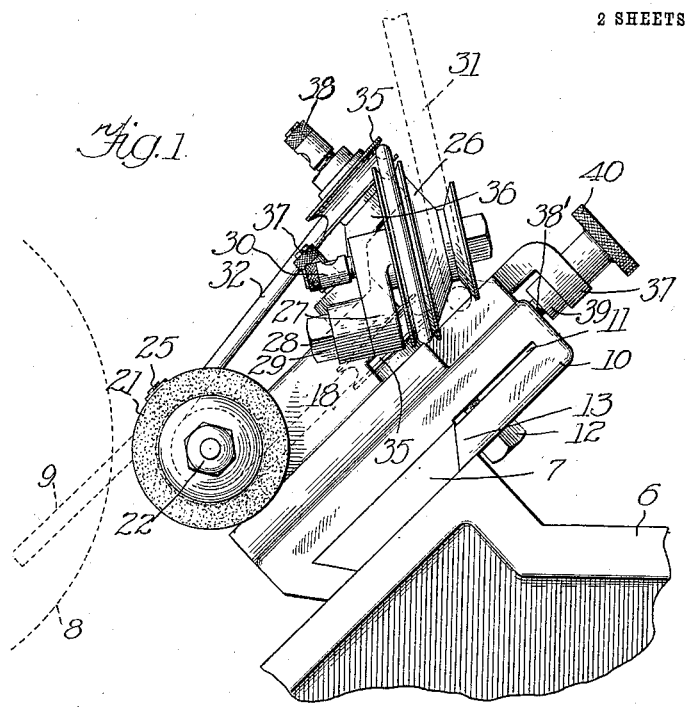
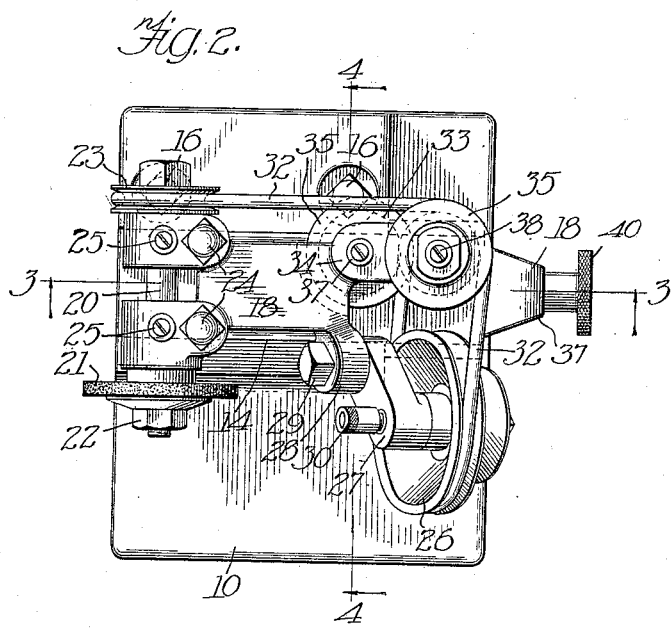
Witnesses:
Robert N. Weir
S. J. Wilson
Inventor
Harrison J. Mitchell
By Linthicum Belt & Fuller
Attys H. J. MITCHELL.
PLANER KNIFE SHARPENER.
APPLICATION FILED MAR. 14, 1910.
990,373.
Patented Apr. 25, 1911.
2 SHEETS—SHEET 2.
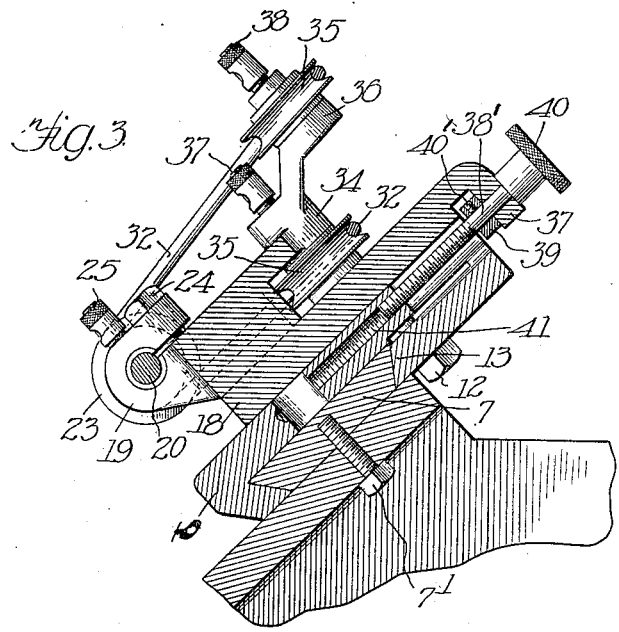
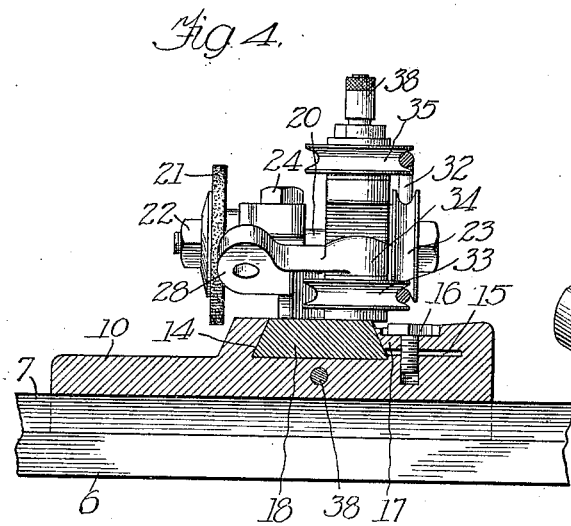
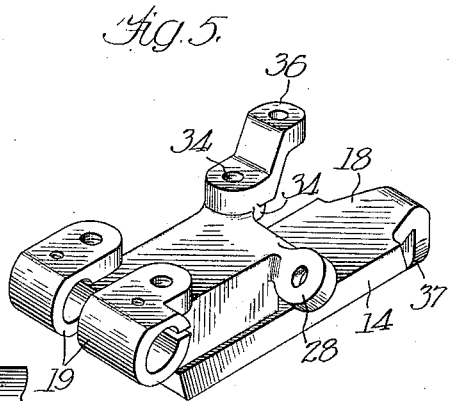

UNITED STATES PATENT OFFICE.

HARRISON J. MITCHELL, OF BELOIT, WISCONSIN, ASSIGNOR TO THE BERLIN MACHINE WORKS, OF BELOIT, WISCONSIN, A CORPORATION OF WISCONSIN.

PLANER-KNIFE SHARPENER.

990,373.

Specification of Letters Patent.  Patented Apr. 25, 1911.

Application filed March 14, 1910. Serial No. 549,208.

*To all whom it may concern:*

Be it known that I, HARRISON J. MITCHELL, a citizen of the United States, residing at Beloit, in the county of Rock and State of Wisconsin, have invented certain new and useful Improvements in Planer-Knife Sharpeners, of which the following is a specification.

My invention concerns devices for sharpening knives of planer heads or cylinders, and aims to provide a grinding device which can be adjusted to any desired position longitudinally of, and toward and from the planer head, and which is capable of being quickly and readily removed from the machine to be replaced by a jointer or other tool.

In order to provide for the interchanging of grinding and jointing mechanisms without removing the tools themselves from their supports, I employ a carriage capable of movement longitudinally of the planer head for the purpose of bringing the operating tool into engagement with the knives throughout their length, and on the carriage I have mounted a grinder block carrying the grinder and its operating or driving mechanism. This block with the grinder and driving mechanism, is adjustable on the carriage toward and from the planer head, and has a sliding engagement with the carriage so that it is capable of being easily and quickly removed therefrom. By mounting jointing, and other tools on standard blocks of this character, I am able to replace one tool by another by simply removing the grinder block and replacing it by the block carrying the tool desired to be used and without removing the tools from the supports on which they are mounted.

For the purpose of adjusting the grinder block toward and from the planer head in order to bring the grinder, jointer or other tool into proper relation to the knives to be operated upon, I have provided an adjusting mechanism by means of which the grinder block may be adjusted toward or from the planer head and retained in its adjusted position.

The invention will be best understood by reference to the following description when taken in connection with the accompanying drawings illustrating a preferred embodiment thereof, while its scope will be more particularly set forth in the appended claims.

Referring to the drawings Figure 1 is an end elevation showing the grinding mechanism as mounted on a planer frame. Fig. 2 is a plan view thereof. Fig. 3 is a section on the line 3—3 of Fig. 2. Fig. 4 is a section on the line 4—4 of Fig. 2, and Fig. 5 is a perspective of the grinder block.

On the drawings, 6 designates a portion of the frame of an ordinary planer in connection with which my invention is adapted to be used, and which has secured thereon a dove-tail guide 7 by bolts 7', said guide extending across the frame in parallel relation to the planer head or cylinder 8 supplied with the usual cutting knives 9 (shown in dotted lines, Fig. 1).

A carriage 10, is provided with an undercut groove adapted to fit over the dove-tail guide 7, and to guide the carriage in its movement longitudinally of the guide and across the planer frame. In order that the carriage may be locked in any desired position on the guide the outer edge of the dove-tail groove is extended outwardly in the form of a slot 11 through which a bolt 12 passes. When it is desired to lock the carriage in position, the bolt 12 is screwed up thereby drawing the lip 13 below the slot 11 into locking engagement with the inclined face of the dove-tail guide, thus frictionally holding the carriage in the desired position.

The carriage 10 is provided on its upper face with an undercut groove 14 extending transversely of the groove on its lower face and one edge of this groove is also extended into a slot 15 and is provided with a bolt 16 adapted to be screwed into the body of the carriage to clamp the lip 17 against the beveled face of a grinder block 18 which is adapted to slide in said groove. It will be evident that the carriage itself is adjustable longitudinally of the guide 7 and can be locked in any desired position by means of the bolt 12, and that the grinder block 18 is adjustable longitudinally of the groove 14 and the upper face of said carriage, and it may be secured in the desired adjusted position in a similar manner by means of the bolt 16.

In order that grinders, jointers, and other tools may be used interchangeably in connection with the carriage 10, I employ a number of blocks 18 of standard sizes, adapted to fit into the groove 14 on the upper face of the carriage, each block being adapted to carry a particular tool and its operating mechanism. These blocks may vary slightly in general contour and minor mechanical variations in form according to the tool which is to be mounted thereon, but they all have the same general characteristics, and I have chosen for the purposes of illustration a grinder block adapted to have mounted thereon a grinder and its driving mechanism.

The grinder block, which is best shown in Fig. 5, is provided at its forward end with a plurality of journal bearings 19 in which the grinder shaft 20 is adapted to be mounted, which shaft carries at one end a grinder tool 21 maintained thereon by a locking bolt 22 of usual construction, and at the other end a pulley 23 secured on the shaft. The bearings may be adapted to take up wear by means of the bolts 24 and are lubricated from the oil cups 25. The pulley 23 is driven from a driving pulley 26 rotatably mounted at the outer end of an arm 27 which is capable of angular adjustment about a lug or ear 28 to which said arm is fastened by means of a bolt 29. The bearing of the pulley 26 is kept properly lubricated by means of an oil cup 30 disposed at one end thereof, as shown. The pulley 26 is grooved to accommodate a driving belt or band 31 which is driven from a motor or from the usual shop driving shaft, and is also provided with a second groove which runs the short driving band 32 from the pulley 26 to the pulley 23 on the grinder shaft.

A guide sheave 33 is mounted in alinement with the lower edge of the pulleys 23 and 26 on a short shaft projecting downwardly from the shoulder 34 on the grinder plate. A guide sheave 35 is mounted on a stub shaft upon the ear or lug 36 and is adapted to guide the upper portion of the belt or band 32. Suitable oil cups 37 and 38 keep the guide sheaves 33 and 35 properly oiled. It will be evident that the band 32 can be tightened or loosened by adjusting the driving pulley 26 by means of the arm 27 upon which it is mounted, and which is capable of angular adjustment about the bolt 29.

When it is desired to remove the grinder and replace it by a jointer or other tool, the driving belt 31 is thrown off the pulley 26 and the grinder block is slid backward out of engagement with the groove 14 on the carriage. A similar block carrying any other tool may then be inserted in its place.

For the purpose of adjusting the grinder toward and from the planer head, I have provided the grinder block at its rear end with a downwardly turned lip 37 adapted to receive the shank of an adjusting screw 38' which is held in place therein by a collar 39 which is slipped over the end of the screw 38' and held in position thereon by means of a small set-screw 40'. The adjusting screw is threaded at its inner end for engagement with a hole 41 tapped into the body of the carriage 10. The outer end of the screw is knurled so that it may be grasped by the hand of the operator to screw it into or out of the threaded hole 41 to adjust the grinder toward or from the knives. As will be evident, when the grinder has been adjusted to the proper position relatively to the planer head by means of the adjusting screw 38', the bolt 16 may be tightened up to securely clamp the grinder block in adjusted position.

It will be obvious that the grinder is capable of adjustment longitudinally of the planer cylinder by moving the carriage 10 along the guide 7, that the grinder may be adjusted by means of the adjusting screw 38' toward and from the planer cylinder, and that the grinder block carrying the guide and its driving mechanism, may be easily and quickly removed from the machine to be replaced by another block carrying the tool which is desired to be used next, by simply loosening the holding bolt 16 and unscrewing the adjusting screw 38' and removing the driving band 31.

While I have shown and described the preferred embodiment of my invention, it will be apparent that various minor mechanical changes may be resorted to without departing from the spirit of the invention or from the scope thereof, as set forth in the claims.

What I claim is:

1. In a planer knife sharpener, the combination of a carriage mounted to slide transversely of a planer frame, a grinder shaft, a drive pulley disposed at an angle to said grinder shaft, a belt connection between said shaft and drive pulley, a grinder block adjustably mounted on said carriage for carrying said grinder shaft, drive pulley and belt connection and adapted to be removed bodily from said carriage, and means whereby said grinder block may be adjusted on said carriage, substantially as described.

2. In a planer knife sharpener, the combination of a guide secured on the planer frame, a carriage adjustable longitudinally of said guide, means for securing said carriage to said guide in adjusted position, a grinder block mounted on said carriage and adjustable transversely thereof, a device for adjusting said block on said carriage, means for retaining said block in adjusted position, and grinding mechanism carried on said block, said mechanism comprising a grinder shaft, a grinder mounted thereon, a drive pulley, and driving connections between said pulley and shaft, substantially as described.

3. In a planer knife sharpener, the combination of a carriage adjustable transversely of a planer frame and provided on its upper surface with an undercut groove, a grinder block having a dove-tail base slidably and removably mounted in said groove, a device for adjusting said block transversely of the carriage, means for locking said block in adjusted position, and grinder mechanism comprising a grinder shaft, a grinder carried thereby, a drive pulley, a belt connecting said drive pulley and shaft, and guide pulleys over which said belt travels mounted on said block, substantially as described.

4. In a planer knife sharpener, in combination, a guide secured on a planer frame, a carriage adjustable longitudinally of said guide, a grinder block mounted on said carriage and capable of movement thereon transversely of the carriage, grinder mechanism carried by said grinder block, and means whereby said grinder mechanism may be adjusted on said carriage, substantially as described.

5. In a planer knife sharpener, in combination, a dove-tail guide secured on a planer frame, a carriage provided with an undercut groove on its lower face, adapted to fit over and slide longitudinally of said dove-tail guide and an undercut groove on its upper face, a grinder block having a dove-tail guide adapted to fit in the undercut groove on said carriage and to be adjusted longitudinally thereof, a grinder journaled on said grinder block, belt and pulley driving mechanism for said grinder mounted upon said block, and means carried by said block and adapted for operative engagement with said carriage, whereby the grinder and the driving mechanism therefor, may be adjusted on said carriage, substantially as described.

6. In a planer knife sharpener, the combination of a dove-tail guide secured on a planer frame, a carriage provided with an undercut groove on its lower face adapted to slide upon said guide, one of the sides of said groove being constructed to yield, means for clamping said side against the guide to lock said carriage in adjusted position, a grinder block removably carried by said carriage, a grinder shaft, an adjustable drive pulley, a belt connecting said shaft and pulley, and an adjustable guide pulley around which said belt travels, all mounted upon and removable with said grinder block, substantially as described.

7. In a planer knife sharpener, the combination of a carriage adapted to be adjusted longitudinally of the planer cylinder, said carriage being provided on its upper face with an undercut groove having a yielding side, a grinder block shaped to slide in said groove, means for actuating said yielding side of the carriage groove for clamping said grinder block in position, and grinder mechanism carried by said block, said grinder mechanism comprising a grinder shaft, a grinder mounted thereon, a drive pulley disposed at an angle to said shaft, a belt connection between said shaft and drive pulley, and belt guides around which the belt travels, substantially as described.

HARRISON J. MITCHELL.

Witnesses:
T. A. HORSTMANN,
L. A. ROSS.

---

Copies of this patent may be obtained for five cents each, by addressing the "Commissioner of Patents, Washington, D. C."